Oct. 20, 1959  YAO T. LI  2,909,327
LAWN SPRINKLER
Filed Oct. 19, 1955  2 Sheets-Sheet 1

INVENTOR.
YAO T. LI
BY George L. Greenfield
His attorney

Oct. 20, 1959

YAO T. LI 2,909,327

LAWN SPRINKLER

Filed Oct. 19, 1955

2 Sheets-Sheet 2

INVENTOR.
Yao T. Li
BY George L. Greenfield
His attorney

United States Patent Office 2,909,327
Patented Oct. 20, 1959

2,909,327

LAWN SPRINKLER

Yao T. Li, Watertown, Mass.

Application October 19, 1955, Serial No. 541,388

8 Claims. (Cl. 239—236)

This invention relates to water sprinkling apparatus and comprises a new and improved multi-pattern lawn sprinkler.

The primary object of my invention is to provide a lawn sprinkler capable of watering the largest area with a given water pressure.

Another important object of my invention is to provide a lawn sprinkler which allows effective soil penetration of the water discharged.

Another important object of my invention is to reduce wind effect upon water discharged from lawn sprinklers.

Still another object of my invention is to provide a lawn sprinkler capable of being adjusted to water lawns of different shapes and areas effectively.

To accomplish these and other objects, my lawn sprinkler includes as one important feature a turbine-like nozzle having a rotating outer casing. The nozzle is carried on the upper end of a conduit mounted on a base and having a flexible section so that the water discharged may be directed in many different directions. The nozzle extends through a pair of mutually perpendicular guides which are pivotally mounted on the base.

The guides are formed in the substantially horizontal portions of inverted U-shaped members and comprise endless tracks which lie on a fixed radius from the flexible section of the conduit. Magnetic wheels fixed to and rotatable with the nozzle casing ride along these tracks. The frictional forces created by the rotating wheels on the tracks cause the U-shaped members including the guides to pivot about the base. As will be explained with greater particularity in the following detailed description, if the diameters of the wheels are equal and the lengths of the tracks are unequal, the nozzle traces a straight line Lissajous figure.

Figures 1, 7:
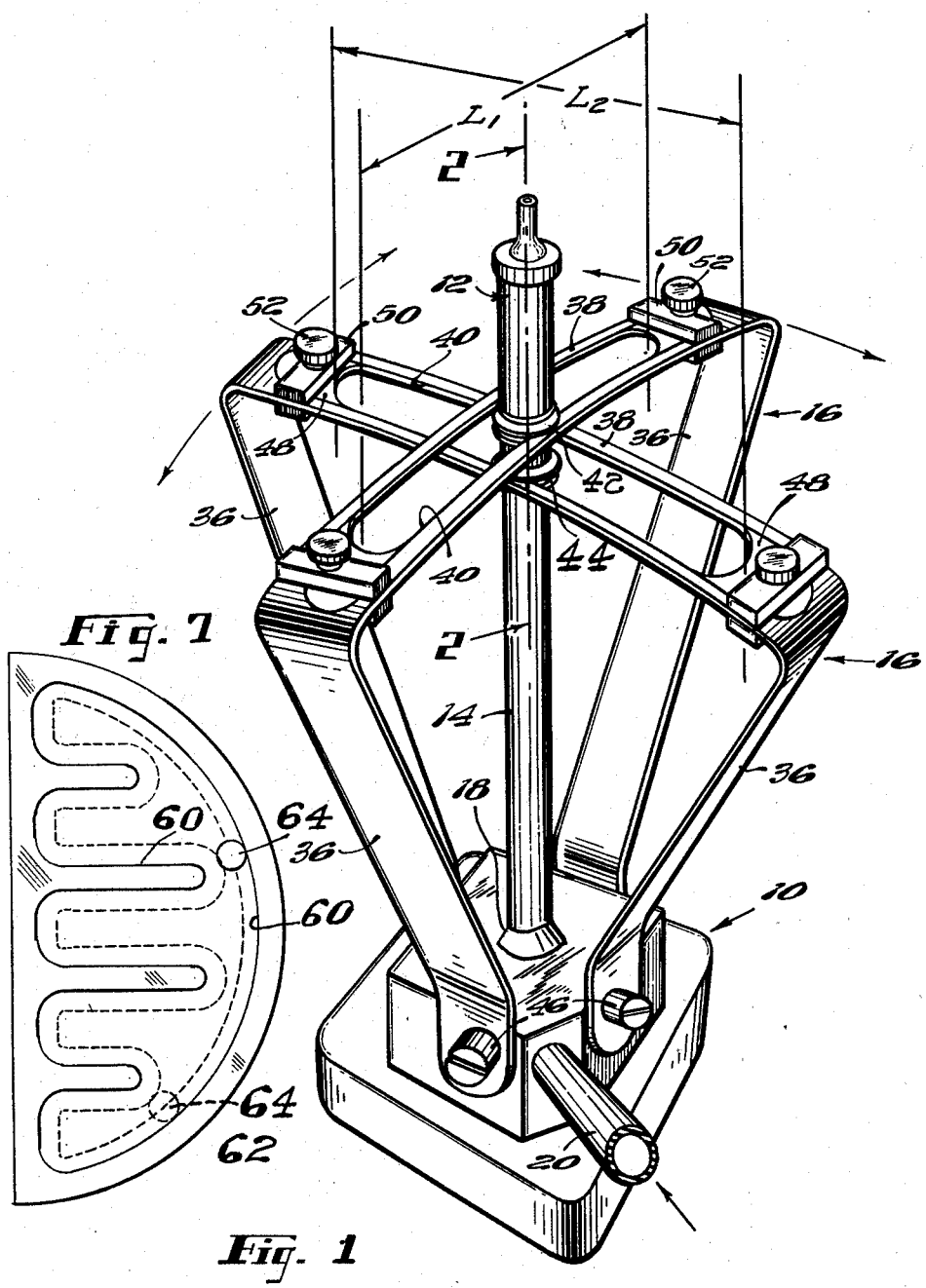
Figure 2:
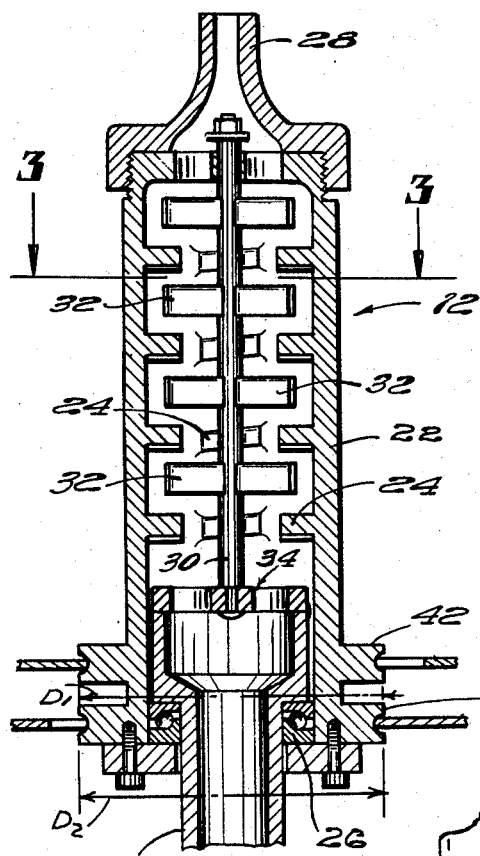
Figure 3:
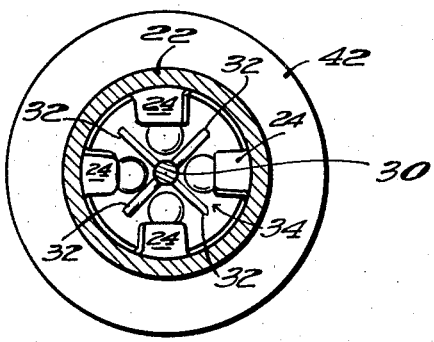
Figure 5:
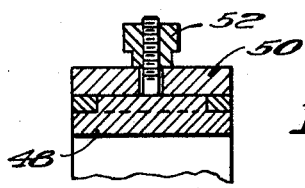
Figure 4:
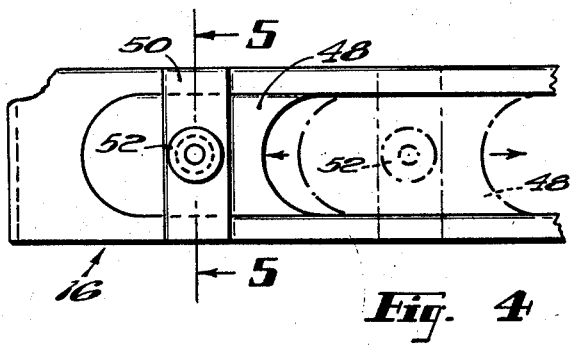
Figure 6:
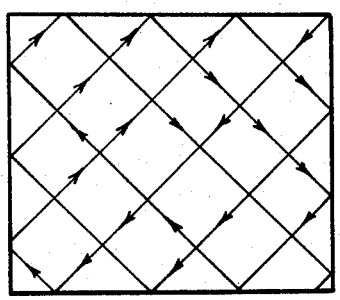

These and other objects and features of my invention along with incident advantages will be better understood and appreciated from the following detailed description of one embodiment thereof, selected for purposes of illustration and shown in the accompanying drawing in which:

Figure 1 is a view in perspective of a lawn sprinkler constructed in accordance with my invention, Figure 2 is a cross-sectional view of a portion of the sprinkler shown in Figure 1 and taken along the corresponding section line in that figure, Figure 3 is a cross-sectional view taken along the corresponding section line in Figure 2, Figure 4 is a plan view of a portion of the sprinkler shown in Figure 1, Figure 5 is a cross-sectional view taken along the corresponding section line in Figure 4, Figure 6 is a diagrammatic view representing the path traced by the nozzle and the area covered by the water discharged from it, and Figure 7 is a plan view of a portion of an alternative embodiment of my invention.

The embodiment of my invention shown in the accompanying drawing includes in its general organization a base 10, a nozzle 12 supported on the upper terminal portion of a rigid conduit 14 extending upwardly from the base, and a pair of inverted substantially U-shaped members 16 pivotally mounted on the base.

A flexible coupling 18 interrupts the conduit 14 immediately above the base 10 and serves as a pivot allowing the nozzle 12 to move freely at a fixed radius from the coupling.

The turbine-like nozzle 12 comprises an outer casing 22 which carries a number of banks of inclined vanes 24. The nozzle casing 22 is mounted on the upper end of the conduit 14 and a fluid tight rotary seal 26 permits the casing 22 to rotate with respect to the conduit. The casing 22 along with the vanes 24 serve as the turbine rotor and are driven by the water directed through the nozzle. A nozzle head 28 is mounted on the upper end of the casing 22 and rotates with it. The stator of the turbine-like nozzle includes a rod 30 which carries a number of radial vanes 32 employed to direct the water flowing through the casing against the inclined vanes 24 of the rotor. The lower end of the rod 30 is connected to a perforated disc or spider 34 on the upper end of the conduit 14 while the upper end of the rod terminates beyond the end of the casing 22 and within the nozzle head 28.

As shown in Figure 1, the coupling 18, the conduit 14 and the nozzle 12 extend upwardly from the base 10 between the upwardly spreading arms 36 of the members 16. The substantially horizontal portions 38 of the members 16 which are crossed contain elongated slots 40 through which the nozzle 12 extends. A pair of wheels 42 and 44 which may be magnetic are mounted on and rotate with the nozzle casing 22 and engage the margins of the upper and lower slots 40, respectively.

The diameters of the wheels 42 and 44 are less than the width of the slots 40; thus, the wheels are free to travel about the sides of the slots which serve as tracks. It is clear from an inspection of Figure 1 that the portions 38 of the members 16 lie on a curved surface defined by the distance of the wheels 42 and 44 from the coupling 18. Therefore, as the nozzle moves within the slots 40, engagement of the wheels 42 and 44 with the margins thereof is assured.

From the foregoing description, those skilled in the art will understand the manner in which the embodiment of my invention operates. Water introduced to the sprinkler through a duct 20 connected to a water source (not shown) passes through the base 10 and upwardly through the flexible coupling 18, the conduit 14 and the nozzle 12. As the water flows through the nozzle 12, it exerts a force against the inclined vanes 24, causing the casing 22 along with the wheels 42 and 44 to rotate. The rotating wheels 42 and 44 follow a path defined by their points of contact along the edges of the substantially perpendicular guides or slots 40. The frictional forces exerted by the wheels against the margins of the slots 40 cause the members 16 to pivot about their respective axes defined by the screws 46 which connect the upwardly spreading arms 36 to the base 10. If the wheels 42 and 44 are magnetic, their engagement with the sides of the slots 40 is assured. However, it will be appreciated that other expedients may be employed to guarantee this contact, such as interlocking flanges on the sides of the wheels and the slots.

The particular path traced by the nozzle 12 is determined by the ratios of the length of one slot 40 over the diameter of the wheel traveling about its margin and the length of the other slot over the diameter of the other wheel contained within it ($L_1/D_1$ and $L_2/D_2$). If these ratios are equal, the nozzle follows a simple path tracing either a single line or rectangular pattern. However, if the ratios are unequal, as by varying the lengths of the slots, the nozzle will trace a pattern of the kind suggested in Figure 6.

In most cases the prime fraction representing the proportion of the ratios should contain relatively larger numbers, that is, the ratio of 11 to 12 or 11 to 15 in most cases gives better water coverage than a ratio of 3 to 4.

The apparatus illustrated in Figure 4 and 5 has been incorporated into my device to provide means for varying the lengths of the slots. One such adjusting device is disposed at each end of the slots 40. This device includes a movable plate 48 which extends downwardly into the slot 40 and a clamping member 50 which includes a thumb screw 52 for securing the plate in any selected position. The plate and clamping member are movable in the slot 40 as suggested by the phantom showing of these elements in Figure 4. Scored markings or notches may be formed on the surface of the member 40 to aid the operator in selecting a desired ratio.

Assume that the diameter of the wheels 42 and 44 are equal, as suggested in Figure 2. To cause the nozzle 12 to trace a path of the type shown in Figure 6, the plates 48 should be positioned so that the effective lengths of the slots 40 are unequal. Obviously, the particular area to be covered determines the ratio selected for the effective lengths of the slots.

In Figure 7, I have illustrated a portion of an alternative embodiment of my invention particularly designed to water a semi-circular area. This embodiment differs from the embodiment previously described in that it includes an endless single fixed track 60 formed in a plate 62 in place of the two movable tracks 70. Preferably, the plane defined by the track is curved so that the track lies on the radius of the wheel or roller with respect to the flexible coupling. As water flows through the nozzle, the roller represented by the circle 64 rotates with the nozzle casing and follows the path suggested by the endless broken line in Figure 7. If the roller is magnetic, continued engagement of the nozzle and the roller is assured. Thus, it is seen that the sprinkler may effectively be used to cover any desired area merely by selecting the proper track for the nozzle to follow.

From the foregoing description, it will be appreciated that a sprinkler embodying my invention can cover the maximum lawn area. The water is discharged from a single outlet under a maximum pressure head and carries much further than water discharged from a sprinkler having a large number of orifices. Because the water discharged does not fall continuously on the same portions of the lawn, the area does not become flooded, nor does the water run off. Rather, it is allowed to penetrate the lawn surface. Furthermore, the single relatively heavy stream of water is not effected by moderate winds while water discharged from the conventional multi-orifice sprinklers is blown off its directed path by even slight winds.

Numerous modifications of the embodiments of my invention illustrated in the drawing will occur to those skilled in the art. For example, although I have illustrated means for varying the lengths of the slots 40 defining the path of travel of the wheels 42 and 44, interchangeable wheels of different diameters could be employed to insure inequality of the ratios referred to above. Furthermore, although a particular vane arrangement has been shown in the nozzle to cause the casing 22 to rotate, it is to be understood that the illustrated embodiment is merely representative of the entire class of nozzles having rotatable outer casings. Also, although the illustrated embodiment includes a flexible coupling 18 which permits the nozzle 12 and the conduit 14 to pivot, the conduit 14 itself may be made of a flexible material which would permit the same movement. However, to insure vertical stability of the nozzle 12, I prefer to use a flexible coupling of the type illustrated.

In view of the numerous modifications which may be made of my invention without departing from the spirit thereof, it is not intended that the breadth of my invention be determined by the foregoing description of but a single embodiment. Rather, it is intended that the scope of my invention be determined by the appended claims and their equivalents.

Having now described my invention, I claim:

1. Apparatus of the class described comprising a base, a pair of inverted U-shaped members disposed in mutually perpendicular vertical planes and having their ends pivotally mounted on the base, an elongated slot cut in the horizontal portions of each of the members, a nozzle having a rotatable outer casing extending through the slots in the horizontal portions of the members and carrying wheels of a diameter less than the width of the slots, one wheel engaging one side of each of the slots, means causing continued engagement of the wheels with the sides of the slots, a hose extending upward from the base and connected to the lower terminal portion of the nozzle, a flexible coupling interconnecting the lower terminal portion of the hose to the base, means for introducing fluid to the hose, and means responsive to the flow of fluid through the nozzle for rotating the nozzle casing.

2. Apparatus of the class described comprising a base, a fluid passage through the base, a conduit extending upwardly from the base and communicating with the passage, said conduit having a flexible section, a nozzle mounted on the upper end of the conduit and having an outer casing which rotates in response to fluid passing through the nozzle, a pair of inverted U-shaped members made of magnetically attracted material mounted on the base and pivotally movable about mutually perpendicular horizontal axes, the horizontal portion of one of the members overlying the horizontal portion of the other of the members, slots cut through the horizontal portions of each of the members and containing the casing of the nozzle, a pair of magnetic wheels fixed to and rotatable with the nozzle casing and of a diameter less than the width of the slots, one of said wheels engaging the side of one of the slots and the other of the wheels engaging the side of the other of the slots, and means for varying the length of each of the slots.

3. Apparatus of the class described, comprising a base, a flexible conduit extending upwardly from the base, a nozzle mounted on the upper terminal portion of the conduit and having an outer casing rotatable in response to fluid passing through said nozzle, a pair of inverted U-shaped members mounted on the base and movable pivotally about mutually perpendicular axes defined by the mounting on the base, endless tracks formed in the horizontal portions of each of the members and surrounding the nozzle casing, wheels fixed to and rotatable with the nozzle casings and engaging the tracks, means causing continued engagement of the wheels with the tracks, and means for varying the length of the tracks.

4. Apparatus of the class described comprising a base, a conduit extending upwardly from the base, flexible means permitting said conduit to move pivotally relative to the base, a nozzle mounted on the upper end of the conduit and having a rotatable outer casing, means for introducing fluid to the conduit, means responsive to the flow of fluid through the nozzle causing its casing to rotate, endless tracks lying a fixed distance from the flexible means and perpendicular to the axis of the nozzle, said tracks being movable in mutually perpendicular directions and at a fixed distance from the flexible means and means carried by the nozzle casing and continuously engaging each of the tracks causing the tracks to move in response to rotation of the outer casing.

5. Apparatus of the class described comprising a nozzle having a rotatable outer casing, means for introducing fluid to the nozzle, means responsive to the flow of fluid through the nozzle causing the casing to rotate, a pair of mutually perpendicular tracks, adjacent the nozzle and movable in mutually perpendicular directions, said tracks defining surfaces perpendicular to the nozzle axis, and wheels fixed to the nozzle casing and attracted to the tracks and causing the tracks to move in response to rotation of the casing.

6. Apparatus of the class described, comprising a base, a fluid passage extending upwardly from the base, a flexible coupling forming part of the passage, a nozzle mounted on the upper terminal portion of the passage, and having an outer casing which rotates in response to fluid passing therethrough, a pair of movable endless tracks defining mutually parallel surfaces and surrounding the nozzle casing, said surfaces defined by the tracks being perpendicular to the axis of the nozzle, means mounted on the nozzle secured to the tracks, and means responsive to rotation of the nozzle casing causing the tracks to move in mutually perpendicular directions.

7. Apparatus of the class described comprising a base, a conduit extending upwardly from the base, flexible means connected to the conduit permitting it to move pivotally with respect to the base, a nozzle mounted on the end of the conduit and having a casing which rotates in response to the flow of fluid through it, a pair of inverted substantially U-shaped members lying in mutually perpendicular planes, the central portions of the members having mutually perpendicular elongated slots through which the nozzle extends, the ends of the members being partially connected to the base, and a pair of wheels fixed to the nozzle casing and adapted to follow the sides of each of the slots.

8. Apparatus of the class described in claim 7, further characterized by means for varying the effective lengths of each of the slots.

References Cited in the file of this patent
UNITED STATES PATENTS

| | | |
|---|---|---|
| 586,161 | Buchanan | July 13, 1897 |
| 1,796,942 | Pottenger | Mar. 17, 1931 |
| 2,022,396 | Wiederhold | Nov. 26, 1935 |
| 2,746,793 | Wyatt | May 22, 1956 |